US008795042B2

(12) United States Patent
Ueda et al.

(10) Patent No.: US 8,795,042 B2
(45) Date of Patent: Aug. 5, 2014

(54) DEFROSTER NOZZLE

(75) Inventors: Kazuhiro Ueda, Fujisawa (JP);
Tadahiro Matsumoto, Fujisawa (JP);
Takehiko Iwamura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 573 days.

(21) Appl. No.: 12/530,132

(22) PCT Filed: Feb. 21, 2008

(86) PCT No.: PCT/JP2008/052930
§ 371 (c)(1),
(2), (4) Date: Sep. 4, 2009

(87) PCT Pub. No.: WO2008/108176
PCT Pub. Date: Sep. 12, 2008

(65) Prior Publication Data
US 2010/0062702 A1 Mar. 11, 2010

(30) Foreign Application Priority Data
Mar. 6, 2007 (JP) .................... 2007-056385

(51) Int. Cl.
*B60H 1/00* (2006.01)
*B60H 1/34* (2006.01)
*B60S 1/54* (2006.01)

(52) U.S. Cl.
USPC .......................................... 454/121; 454/127

(58) Field of Classification Search
CPC ...... B60H 1/34; B60H 1/242; B60H 1/00028; B60H 1/00564; B60S 1/54
USPC .............................................. 454/121, 127
See application file for complete search history.

(56) References Cited

U.S. PATENT DOCUMENTS 1,758,705 A * 5/1930 Kean .............................. 454/127
2,415,740 A * 2/1947 Gammack ..................... 454/121
(Continued)

FOREIGN PATENT DOCUMENTS

DE 2627375 A * 12/1977
JP 53-138350 U 11/1978
(Continued)

OTHER PUBLICATIONS

JP2000-085345A, Hino Motors, published Mar. 28, 2000, English machine translation.*

*Primary Examiner* — Kang Hu
*Assistant Examiner* — Phillip E Decker

(57) ABSTRACT

Provided is a defroster nozzle 4 which blows out air to an inner surface of a windshield 2 of a vehicle 1. The defroster nozzle 4 includes center-duct 45 forming member 41 and two end-portion-duct forming members 50. The center-duct 45 forming member 41 forms a center duct through which the air circulates, and has a center ventilation outlet 47 through which the air in the center duct is blown out to the inner surface of the windshield 2. The two end-portion-duct 54 forming members 50 are coupled respectively to two joint end portions 42, on outer sides in the vehicle width direction, of the center-duct forming member 41. Each end-portion-duct forming member 50 forms an end-portion duct which communicates with the center duct, and each end-portion-duct forming member 50 has an end-portion ventilation outlet 55 through which the air in the end-portion duct is blown out to the inner surface of the windshield 2. Each of the end-portion-duct forming members 50 is coupled to the center-duct forming member 41 so as to be capable of tilting relative to the center-duct forming member 41.

4 Claims, 1 Drawing Sheet

(56) References Cited

U.S. PATENT DOCUMENTS

| | | | | |
|---|---|---|---|---|
| 2,677,155 | A | * | 5/1954 | Wise ............................ 454/127 |
| 2,696,774 | A | * | 12/1954 | Bayley ......................... 454/120 |
| 2,800,285 | A | * | 7/1957 | Muller et al. .................. 237/28 |
| 5,048,873 | A | * | 9/1991 | Allread et al. ................ 285/261 |
| 5,113,748 | A | * | 5/1992 | Shibuya ........................ 454/127 |
| 6,053,538 | A | * | 4/2000 | Hauer et al. .................. 285/261 |
| 6,685,261 | B2 | * | 2/2004 | Brancheriau et al. ......... 296/208 |
| 7,237,808 | B2 | * | 7/2007 | Porter ........................... 285/261 |
| 2001/0016472 | A1 | * | 8/2001 | Herta ............................ 454/121 |
| 2003/0083006 | A1 | * | 5/2003 | Brancheriau et al. ......... 454/155 |
| 2007/0209663 | A1 | * | 9/2007 | Marque et al. ........... 128/207.11 |

FOREIGN PATENT DOCUMENTS

| | | |
|---|---|---|
| JP | 54-11458 U | 1/1979 |
| JP | 56-168454 U | 12/1981 |
| JP | 6-20149 U | 3/1994 |
| JP | 2000-085345 A | 3/2000 |
| JP | 2002-144846 A | 5/2002 |
| JP | 2004-017837 A | 1/2004 |

* cited by examiner

DEFROSTER NOZZLE

TECHNICAL FIELD

The present invention relates to a defroster nozzle of a vehicle.

BACKGROUND ART

A defroster nozzle is known as a means for guiding air, supplied by a blower, to the interior surface of a windshield of a vehicle in order to clear fog due to moisture or ice condensed on the windshield.

Patent Document 1: JP-U-6-20149

DISCLOSURE OF THE INVENTION

Problems to be Solved by the Invention

A windshield commonly has a shape that is curved in the vehicle width direction. For the purpose of guiding air along the surface of the windshield, it is preferable that the defroster nozzle be designed to have a shape that is adapted to the curved shape of the windshield.

Suppose that defroster nozzles of identical shapes are employed in vehicles having differently-curved windshields. In this case, the air may be blown to the entire surface of the windshield of each vehicle so ineffectively that the windshield can be defogged only insufficiently.

If defroster nozzles with different shapes are used respectively for the vehicles equipped with differently-curved windshields, the inconveniences mentioned above will not take place. The use of such defroster nozzles, however, results in an increase in the number of parts and eventually an increase in the manufacturing cost.

The present invention is made in view of the above-described circumstances. The present invention, therefore, aims to provide a defroster nozzle capable of defogging the windshield effectively and of reducing the cost.

Means for Solving the Problems

To achieve the above-mentioned object, the present invention provides a defroster nozzle which is installed so as to extend in a vehicle-width direction along an inner surface of a windshield of a vehicle, and which blows supplied air out to the inner surface of the windshield. The defroster nozzle includes a center-duct forming member and two end-portion-duct forming members.

The center-duct forming member defines a center duct through which the air circulates, and has at least one center ventilation outlet formed therein through which the air in the center duct is blown out to the inner surface of the windshield. The two end-portion-duct forming members are coupled respectively to two end portions, on outer sides in the vehicle width direction, of the center-duct forming member. Each end-portion-duct forming member defines an end-portion duct which communicates with the center duct, and each end-portion-duct forming member has at least one end-portion ventilation outlet formed therein through which the air in the end-portion duct is blown out to the inner surface of the windshield. Each of the end-portion-duct forming members is coupled to the center-duct forming member so as to be capable of tilting relative to the center-duct forming member.

In the configuration described above, each of the end-portion-duct forming members is coupled to the center-duct forming member so as to be capable of tilting relative to the center-duct forming member. Accordingly, the defroster nozzle can be installed with its shape being as closely adapted to the curved shape, in the vehicle-width direction, of the windshield as possible. Consequently the center ventilation outlet and the end-portion ventilation outlets can be directed so as to fit the curved shape of the windshield, and the center ventilation outlet and the end-portion ventilation outlets can blow out air effectively enough to clear the fogged windshield.

In addition, even if there are vehicles of various models equipped respectively with differently-curved windshields, the defroster nozzle can be installed in each vehicle with the shape of the defroster nozzle being closely adapted to the curved windshield of that particular vehicle. Accordingly, the defroster nozzle can be employed commonly by all the vehicles equipped respectively with differently-curved windshield, so that a cost reduction can be accomplished.

Effects of the Invention

According to the present invention, the windshield can be defogged effectively and the cost can be reduced.

Figure 1:
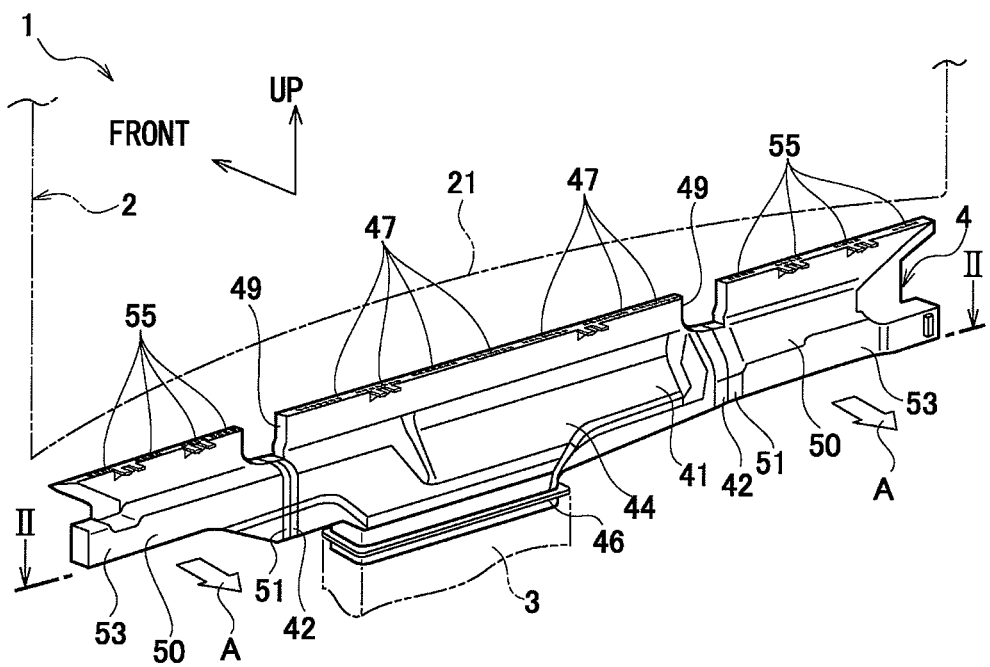
FIG. 1 is a perspective view illustrating a state in which a defroster nozzle according to an embodiment of the present invention is mounted on a vehicle.

DESCRIPTION OF SYMBOLS 1 vehicle
2 windshield
3 blower port
4 defroster nozzle
21 bottom edge
41 center-duct forming member
42 connecting end portion (end portions)
43 front-side plate
44 rear-side plate
45 center duct
46 blower inlet
47 center ventilating outlet
48 ventilating opening
49 windshield fixing portion
50 end-portion-duct forming member
51 engagement portion
52 front-side plate
53 rear-side plate
54 end-portion duct
55 end-portion ventilating hole
56 ventilation-air inlet portion

BEST MODES FOR CARRYING OUT THE INVENTION

An embodiment of the present invention will be described below by referring to the drawings.

Figure 2:
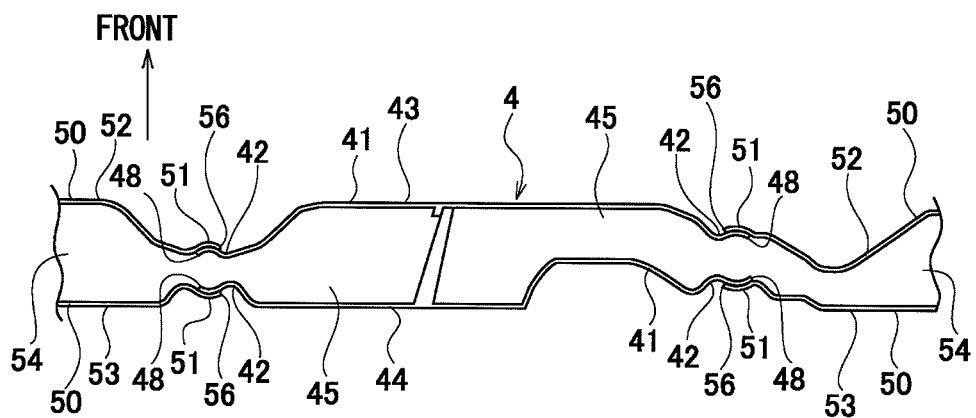
FIG. 2 is a sectional view of the defroster nozzle of FIG. 1 taken along and viewed as indicated by the arrowed line II-II.

FIG. 1 is a perspective view illustrating a state in which a defroster nozzle according to an embodiment of the present invention is mounted on a vehicle. FIG. 2 is a sectional view of the defroster nozzle of FIG. 1 and taken along and viewed as indicated by the arrowed line II-II. In the following description, the term "forwards" means "towards the direction in which the vehicle advances" while "rearwards" means "towards the opposite direction to the vehicle-advancing direction." In addition, each of the arrows FRONT in the drawings indicates the front side of the vehicle while the arrow UP indicates the upper side of the vehicle.

As FIG. 1 shows, a vehicle 1 of this embodiment includes a windshield 2, a blower port 3, and a defroster nozzle 4.

The windshield 2 is a transparent and plate-shaped member, and is disposed on the front side of the occupants' space of the vehicle 1.

The blower port 3 is connected to an air-conditioning system (not illustrated) via a duct (not illustrated). The conditions of air have been modified by the air-conditioning system, and then the resultant air flows out through the blower port 3.

The defroster nozzle 4 includes a center-duct forming member 41 and two end-portion-duct forming members 50, and is installed so as to extend in the vehicle width direction along a bottom edge 21 of the inner surface of the windshield 2, that is, along the bottom edge 21 of the surface of the windshield 2 located on the occupants' space side. Two panel-fixing portions 49 are formed in the defroster nozzle 4 to fix the defroster nozzle 4 to a dash panel (not illustrated). Each panel-fixing portion 49 is formed just above the joint portion of the center-duct forming member 41 with each end-portion-duct forming member 50. Note that each panel-fixing portion 49 is formed by cutting away both a part of the center-duct forming member 41 and a part of each end-portion-duct forming member 50. Each panel-fixing portion 49, however, may be formed, for example, by cutting away only a part of the center-duct forming member 41.

As FIGS. 1 and 2 show, the center-duct forming member 41 is disposed substantially at the center of the bottom edge 21 of the windshield 2. Joint end portions 42 (end portions) are formed as integral parts respectively in the two end portions, in the vehicle-width direction, of the center-duct forming member 41. The center-duct forming member 41 is made of a cured resin, such as polypropylene, and is formed by joining a front-side plate 43 and a rear-side plate 43 together. Inside the center-duct forming member 41, a center duct 45 is formed by the front-side plate 43 and the rear-side plate 44. A blower inlet 46 formed in a bottom portion of the center-duct forming member 41 is an opening formed on the bottom side of the center duct 45. Multiple center ventilation outlets 47 formed in an upper portion of the center-duct forming member 41 are openings formed on the top side of the center duct 45. Two ventilation openings 48 are formed respectively in the end portions, in the vehicle-width direction, of the joint end portions 42. The ventilation openings 48 are openings formed respectively on the two sides, in the vehicle-width direction, of the center duct 45.

The blower inlet 46 of the center-duct forming member 41 is coupled to the blower port 3. Part of the air that has flowed into the center duct 45 through the blower inlet 46 formed in the center-duct forming member 41 blows out to the inner surface of the windshield 2 through the center ventilation outlets 47. Other part of the air blows out through the ventilation openings 48 to end-portion ducts 54 of the end-portion-duct forming members 50, which will be described later.

The two end-portion-duct forming members 50 are disposed respectively at the two ends, in the vehicle-width direction, of the center-duct forming member 41. An engagement portion 51 is formed as integral part in the inner-side end portion, in the vehicle-width direction, of each end-portion-duct forming member 50. The end-portion-duct forming members 50 are made of a cured resin, such as polypropylene. Each end-portion-duct forming member 50 is formed by joining a front-side plate 52 and a rear-side plate 53 together.

Inside each end-portion-duct forming member 50, the end-portion duct 54 is formed by the front-side plate 52 and the rear-side plate 53. Multiple end-portion ventilation outlets 55 formed in an upper portion of each end-portion-duct forming member 50 are openings formed on the top side of the end-portion duct 54. A ventilation-air inlet portion 56 formed in an inner-end portion, in the vehicle-width direction, of each end-portion-duct forming member 50 is an opening formed on the inner side, in the vehicle-width direction, of the end-portion-duct forming member 50.

The center-duct forming member 41 is coupled to each end-portion-duct forming member 50 with the corresponding joint end portion 42 being fitted into the engagement portion 51 of the end-portion-duct forming member 50. With the center-duct forming member 41 being coupled to the end-portion-duct forming members 50, the ventilation openings 48 of the center-duct forming member 41 are opened inside the respective end-portion ducts 54 of the end-portion-duct forming members 50. Thus the end-portion-duct forming members 50 and the center-duct forming member 41 are coupled together in a manner similar to pipe joints. The center duct 45 communicates with the end-portion ducts 54, so that the air can circulate from the center duct 45 to the end-portion ducts 54, or vice versa.

The air that has been flowed into each end-portion duct 54 through the ventilation-air inlet portion 56 of the corresponding end-portion-duct forming member 50 blows out through the end-portion ventilation outlets 55.

Each joint end portion 42 of the center-duct forming member 41 and the engagement portion 51 of each end-portion-duct forming member 50 are coupled together in the following way. FIG. 2 shows a section including the joint end portions 42 of the center-duct forming member 41 and the engagement portions 51 of the end-portion-duct forming members 50. In the horizontal section taken at an arbitrarily-determined vertical position, while the outer circumference of each joint end portion 42 of the center-duct forming member 41 has a predetermined radius, the inner circumference of the engagement portion 51 of each end-portion-duct forming member 50 has a radius that is substantially equal to the above-mentioned radius of the outer circumference of the joint end portion 42 of the center-duct forming member 41. With the joint end portion 42 and the engagement portion 51 being coupled together, the outer circumference of the joint end portion 42 and the inner circumference of the engagement portion 51 are in a surface-to-surface contact with each other while joint end portion 42 and the engagement portion 51 can slide on each other. Accordingly, the outer-end portion, in the vehicle-width direction, of each end-portion-duct forming member 50 can tilt forwards and rearwards pivotally about the joint end portion 42 of the center-duct forming member 41. In addition, in the horizontal section taken at an arbitrarily-determined vertical position, the ventilation-air inlet portion 56 formed in the engagement portion 51 of each end-portion-duct forming member 50 has a diameter that is smaller than the diameter of the outer circumference of the joint end portion 42 of the center-duct forming member 41. Accordingly, once the each end-portion-duct forming member 50 has been coupled to the center-duct forming member 41, the end-portion-duct forming member 50 is prevented from sliding in the vehicle-width direction off from the center-duct forming member 41.

When the defroster nozzle 4 is installed, each end-portion-duct forming member 50 tilts at a predetermined angle relative to the center-duct forming member 41 so that the defroster nozzle 4 fits to the curved shape of the windshield 2.

To put it differently, the defroster nozzle 4 of FIG. 1 is installed with its end-portion-duct forming members 50 tilting rearwards (in the direction indicated by the arrows A) from their respective positions illustrated in FIG. 1 so that the defroster nozzle 4 can fit the curved shape of the windshield 2.

Each end-portion-duct forming member 50 of this embodiment is coupled to the center-duct forming member 41 so as to be capable of tilting relative to the center-duct forming member 41. Accordingly, the defroster nozzle 4 can be installed with its shape being as closely adapted to the curved shape, in the vehicle-width direction, of the windshield 2 as possible. Consequently, the center ventilation outlets 47 and the end-portion ventilation outlets 55 can be directed so as to fit the curved shape of the windshield 2, and the center ventilation outlets 47 and the end-portion ventilation outlets 55 can blow out air along the surface of the windshield 2 effectively enough to clear the fogged windshield 2.

In addition, even if there are vehicles 1 of various models equipped respectively with differently-curved windshields 2, the defroster nozzle 4 can be installed in each vehicle 1 with the shape of the defroster nozzle 4 being closely adapted to the curved windshield 2 of that particular vehicle 1. Accordingly, the defroster nozzle 4 can be employed commonly by all the vehicles 1 equipped respectively with differently-curved windshields 2, so that a cost reduction can be accomplished.

In addition, the blower inlet 46 formed in the center-duct forming member 41 is the only inlet that the air flowed out through the blower port 3 has to pass through before the air can be supplied to the defroster nozzle 4. Accordingly, even if there are vehicles 1 of various models equipped respectively with differently-curved windshields 2, installing the defroster nozzle 4 with a predetermined portion thereof located at the center, in the vehicle-width direction, of each vehicle 1 requires the blower port 3 to be located at the a position that is a certain distance away from the center in the vehicle-width direction, of that particular vehicle 1. Here, the certain distance is common to all the vehicles 1 equipped respectively with differently-curved windshields. Accordingly, even if there are vehicles 1 of various models equipped respectively with differently-curved windshields 2, the position of the blower port 3 can be designed at a position that is located the certain common distance away from the center, in the vehicle-width direction, of each vehicle 1. Consequently, a cost reduction can be accomplished.

In addition, each panel-fixing portion 49 of the defroster nozzle 4 is formed at the joint portion between the center-duct forming member 41 and the corresponding end-portion-duct forming member 50. Accordingly, even if the defroster nozzle 4 is installed with the end-portion-duct forming member 50 tilting relative to the center-duct forming member 41, the panel-fixing portion 49 can be positioned a substantially constant distance away from the center, in the vehicle-width direction, of the vehicle 1.

Accordingly, even if there are vehicles 1 of various models equipped respectively with differently-curved windshields 2, fixing portions can be designed to be formed at common positions of the dash panel to all the vehicles 1. Consequently, a cost reduction can be accomplished.

In the above-described embodiment, the joint end portions 42 and engagement portions 51 are structures configured to couple the end-portion-duct forming members 50 to the center-duct forming member 41 so as to allow the end-portion-duct forming member 50 to tilt relative to the center-duct forming member 41. The joint end portions 42 are formed as integral parts of the center-duct forming member 41, and the engagement portions 51 are formed as integral parts of their respective end-portion-duct forming members 50. Alternatively, independent members may be provided to couple the end-portion-duct forming members 50 to the center-duct forming member 41.

INDUSTRIAL APPLICABILITY

The present invention is suitably used for various types of vehicles equipped with their respective windshields.

The invention claimed is:

1. A defroster nozzle which is installed to extend in a vehicle-width direction along an inner surface of a windshield of a vehicle, and which blows supplied air out to the inner surface of the windshield, the defroster nozzle comprising:
 a center-duct forming member which defines a center duct through which the air circulates, and comprises:
  a center-portion front member, which is formed to extend in the vehicle-width direction and comprises first center-portion curving surfaces on outer sides, in the vehicle width direction,
  a center-portion rear member which is formed to extend in the vehicle-width direction opposing the center-portion front member and joined to the center-portion front member to form the center-duct forming member, and comprises second center-portion curving surfaces on the outer sides, in the vehicle width direction,
  at least one center ventilation outlet which is formed in a top surface of the center-duct forming member disposed between the center-portion front portion and the center-portion rear portion, and through which the air in the center duct is blown out to the inner surface of the windshield, and
  first end portions which are formed by the first and second center-portion curving surfaces opposing each other and disposed on the outer sides, in the vehicle width direction, of the center-duct forming member; and
 two end-portion-duct forming members coupled respectively to the first end portions of the center-duct forming member, each end-portion-duct forming member defining an end-portion duct which communicates with the center duct and having:
  an end-portion front member, which is formed to extend in the vehicle-width direction and comprises a first end-portion curving surface on an inner side, in the vehicle width direction,
  an end-portion rear member which is formed to extend in the vehicle-width direction opposing the end-portion front member and joined to the end-portion front member to form the end-portion duct, and comprises a second end-portion curving surface on the inner side, in the vehicle width direction,
  at least one end-portion ventilation outlet which is formed in a top surface of the end-portion duct disposed between the end-portion front portion and the end-portion rear portion, and through which the air in the end-portion duct is blown out to the inner surface of the windshield, and
  an engagement portion which is formed by the first and second end-portion curving surfaces opposing each other and disposed proximate the center-duct forming member,
 wherein each of the end-portion-duct forming members is coupled to the center-duct forming member to be tiltable relative to the center-duct forming member as an outer circumference formed by the first and second center-portion curving surfaces of a respective first end portion of the center-duct forming member and an inner circumference formed by the first and second end-portion curving surfaces of a respective engagement portion of the end-portion-duct forming member are in a surface-to-surface contact with each other while the respective first end portions are slidably inserted inside the respective engagement portions.

2. The defroster nozzle according to claim 1, wherein a plurality of center ventilation outlets is formed in the top surface of the center-duct forming member defining the top surface of the center duct, and a plurality of ventilation outlets is formed in the top surface of each of end-portion-duct forming members defining the top surface of a respective end-portion duct.

3. The defroster nozzle according to claim 1, wherein two panel-fixing portions are formed in the defroster nozzle to fix the defroster nozzle top a dash panel, and each of the two panel-fixing portions is formed at a joint portion between the center-duct forming member and each of the end-portion-duct forming members.

4. The defroster nozzle according to claim 3, wherein in a horizontal section taken at an arbitrarily-determined vertical position, a ventilation air inlet portion formed in the engagement portions of each end-portion-duct forming member has a diameter that is smaller than a diameter of an outer circumference of the first end portion of the center-duct forming member.

* * * * *